(12) United States Patent
Chernoff

(10) Patent No.: US 8,007,669 B1
(45) Date of Patent: Aug. 30, 2011

(54) TOP LOADING FILTER CANISTER SYSTEM

(76) Inventor: Larry J. Chernoff, Calgary (CA)

( * ) Notice: Subject to any disclaimer, the term of this patent is extended or adjusted under 35 U.S.C. 154(b) by 0 days.

(21) Appl. No.: 12/803,339

(22) Filed: Jun. 24, 2010

(51) Int. Cl.
*B01D 27/08* (2006.01)
*B01D 35/30* (2006.01)
(52) U.S. Cl. .......... 210/232; 210/444
(58) Field of Classification Search .......... 210/232, 210/444
See application file for complete search history.

(56) References Cited

U.S. PATENT DOCUMENTS

| | | | |
|---|---|---|---|
| 4,367,144 A | * | 1/1983 | Peters et al. .......... 210/234 |
| 5,006,235 A | * | 4/1991 | Cooper .......... 210/136 |
| 5,670,042 A | * | 9/1997 | Clausen et al. .......... 210/238 |
| 5,858,227 A | * | 1/1999 | Stone et al. .......... 210/234 |

* cited by examiner

*Primary Examiner* — Thomas M Lithgow

(57) ABSTRACT

A housing has a cylindrical side wall with lower and upper ends. The housing has a cylindrical chamber with an enlarged upper region. A basket is positioned within the chamber supported at the lower end of the housing. A filter has a central cylinder and outwardly extending filtering surfaces. The central cylinder is provided coaxial with the side wall. A stationary cap is attached to the upper end of the housing. The stationary cap has an upper end with a threaded aperture. The stationary cap has input and exit passages. A filter cap has a threaded exterior surface removably received in the threaded aperture. A flow discharge passage has a lower end positioned within the filter. The flow discharge passage has an upper end coupled to the exit passage. An annular flow cavity is provided between the flow discharge passage and the exit passage.

4 Claims, 4 Drawing Sheets

FIG. 5
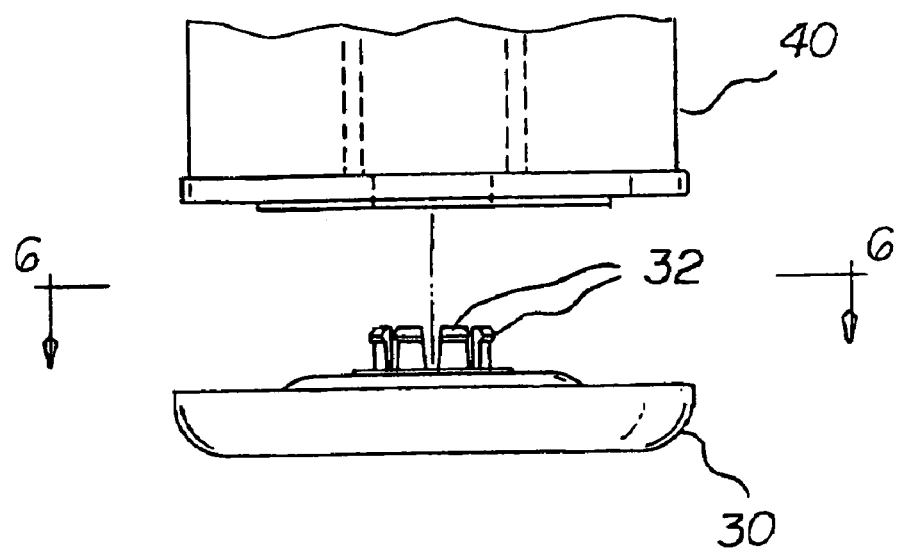
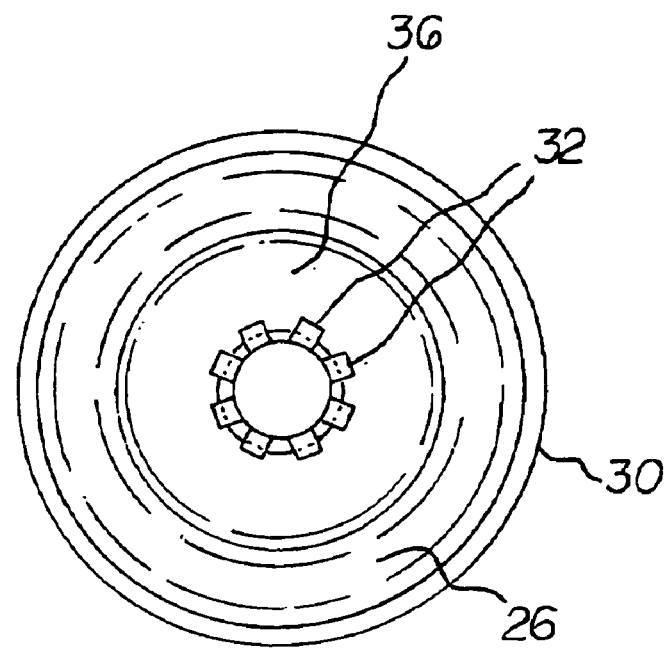
FIG. 6

TOP LOADING FILTER CANISTER SYSTEM

BACKGROUND OF THE INVENTION

Field of the Invention

The present invention relates to a top loading filter canister system and more particularly pertains to filtering fluids and featuring ready servicing of the system, the filtering and the servicing being done in a safe, convenient and economical manner.

SUMMARY OF THE INVENTION

In view of the foregoing disadvantages inherent in the known types of and the servicing being done in a safe, convenient and economical manner now present in the prior art, the present invention provides an improved top loading filter canister system. As such, the general purpose of the present invention, which will be described subsequently in greater detail, is to provide a new and improved top loading filter canister system and method which has all the advantages of the prior art and none of the disadvantages.

To attain this, the present invention essentially comprises a top loading filter canister system. First provided is a housing. The housing has a vertically extending cylindrical side wall. The side wall has a lower end below. The side wall has an open upper end above. A length is provided between the upper and lower ends. The housing has a cylindrical chamber. The chamber has an enlarged upper region. The upper region of the chamber has a length. The length of the upper region is equal to between 10 and 25 percent of the length of the housing. The lower end of the housing has a lower passage. The lower passage has internal threads. In this manner a drain valve is accepted.

A basket is provided. The basket is positioned within the chamber. The basket is supported at the lower end of the housing. The basket has radially interior, upwardly extending, resilient pins. The basket also has a radially exterior annular fluid passage. The basket also has an intermediate annular raised ridge.

Provided next is a filter. The filter is formed has a central cylinder. The central cylinder is provided coaxial with the side wall. The central cylinder has outwardly extending filtering surfaces. The filter is removably received within the chamber. The filter is sealingly supported upon the raised ridge of the basket. The filter has an upper end and a lower end. The lower end of the filter removably receives the resilient pins of the basket.

Further provided is a stationary cap. The stationary cap is provided coaxial with the side wall attached to the upper end of the housing. The stationary cap has an upper end. The upper end of the stationary cap has a threaded aperture. The stationary cap has a radially extending input passage. The input passage extends from exterior of the system. A fluid channel is provided. The fluid channel is provided between the input passage and the enlarged upper region of the chamber. The stationary cap has a radially extending exit passage. The exit passage extends to exterior of the system.

Provided last is a filter cap. The threaded exterior surface has a threaded exterior surface. The filter cap is removably received in the threaded aperture of the stationary cap. The threaded exterior surface has a diameter. The diameter of the threaded exterior surface is less than the diameter of the upper region of the housing. The diameter of the threaded exterior surface is greater than the diameter of the housing beneath the enlarged upper region. The filter cap has o-rings. The o-rings are provided beneath the threaded exterior surface. The o-rings are positionable against the stationary cap. The filter cap has a hexagonal raised section. In this manner the removal of the filter cap from the stationary cap is assisted. An L-shaped flow discharge passage is provided. The lower end of the discharge passage has a flange. The flange is positioned within the filter. The discharge passage has an upper end. An annular flow cavity is provided. The annual flow cavity is provided between the flow discharge passage and the exit passage. When removed the filter cap is adapted to provide access to the housing. In this manner the system may be serviced. Servicing of the system includes the changing of the filter.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims attached.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved top loading filter canister system which has all of the advantages of the prior art filtering systems of known designs and configurations and none of the disadvantages.

It is another object of the present invention to provide a new and improved top loading filter canister system which may be easily and efficiently manufactured and marketed.

It is further object of the present invention to provide a new and improved top loading filter canister system which is of durable and reliable constructions.

An even further object of the present invention is to provide a new and improved top loading filter canister system which is susceptible of a low cost of manufacture with regard to both materials and labor, and which accordingly is then susceptible of low prices of sale to the consuming public, thereby making such top loading filter canister system economically available to the buying public.

Even still another object of the present invention is to provide a top loading filter canister system for filtering fluids and featuring ready servicing of the system, the filtering and the servicing being done in a safe, convenient and economical manner.

Lastly, it is an object of the present invention to provide a new and improved top loading filter canister system. A housing has a cylindrical side wall. The side wall has lower and upper ends. The housing has a cylindrical chamber with an enlarged upper region. A basket is positioned within the chamber supported at the lower end of the housing. A filter has a central cylinder and outwardly extending filtering surfaces. The central cylinder is provided coaxial with the side wall. A stationary cap is attached to the upper end of the housing. The stationary cap has an upper end with a threaded aperture. The stationary cap has input and exit passages. A filter cap has a threaded exterior surface removably received in the threaded aperture. A flow discharge passage has a lower end positioned within the filter. The flow discharge passage has an upper end coupled to the exit passage. An annular flow cavity is provided between the flow discharge passage and the exit passage.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 5 is an enlarged exploded view of a portion of the system taken at Circle 5 of FIG. 4.

FIG. 6 is a plan view of the portion of the system taken along line 2-2 of FIG. 1.

The same reference numerals refer to the same parts throughout the various Figures.

DESCRIPTION OF THE PREFERRED EMBODIMENT

Figure 1:
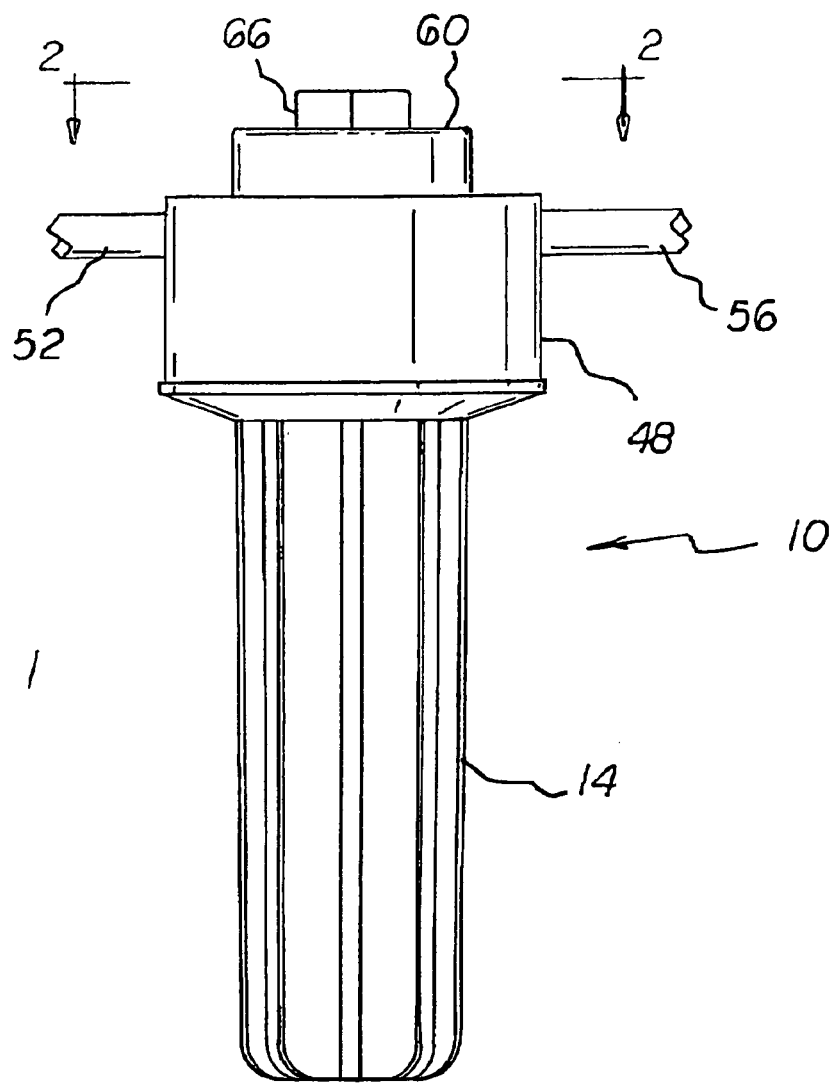
FIG. 1 is a front elevational view of a top loading filter canister system constructed in accordance with the principles of the present invention.
Figure 2:
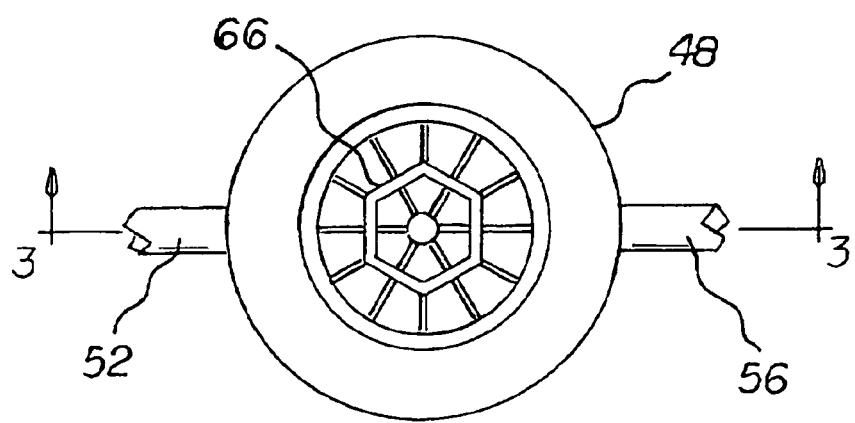
FIG. 2 is a plan view of the system taken along line 2-2 of FIG. 1.
Figure 3:
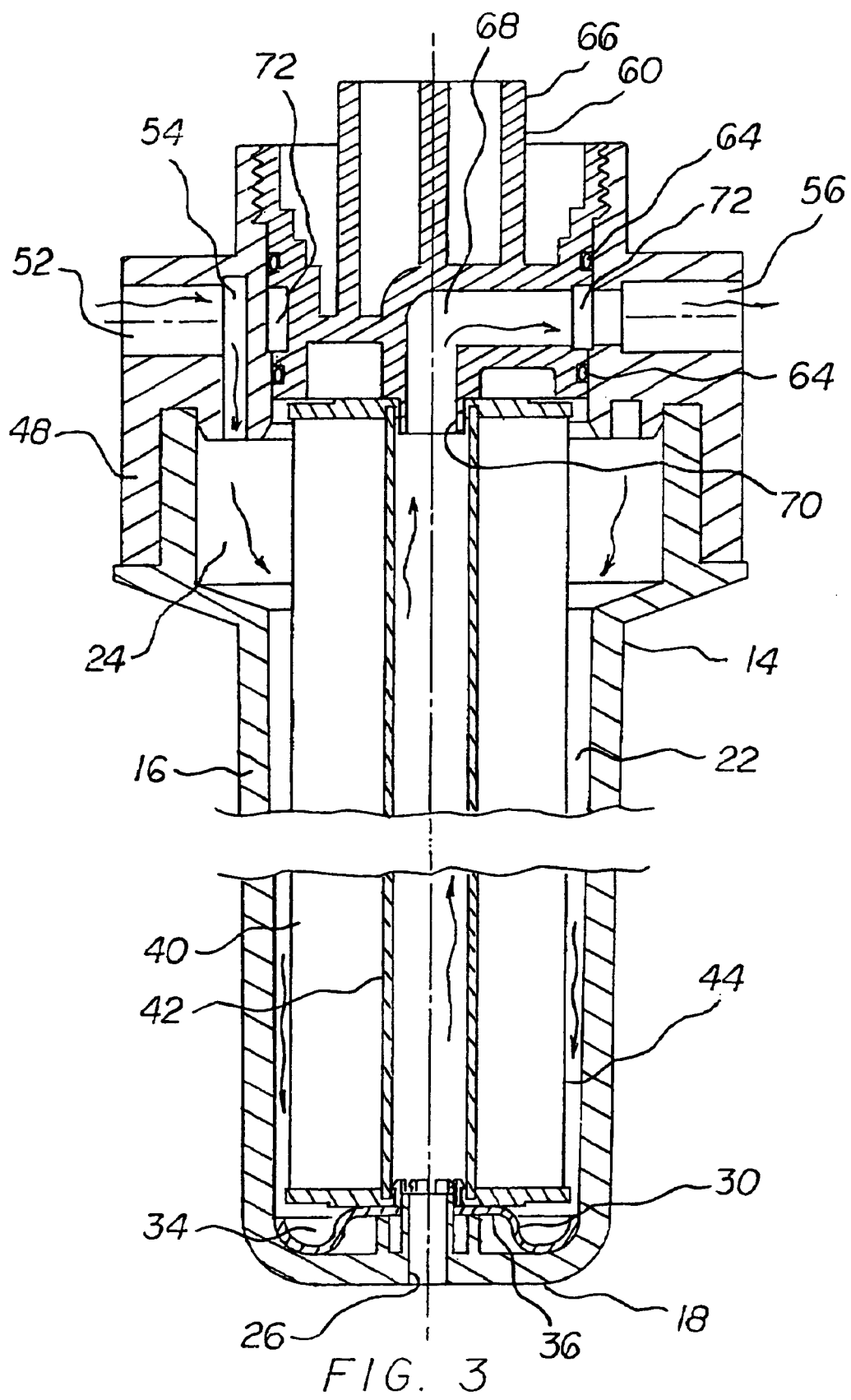
FIG. 3 is a cross sectional view taken along line 3-3 of FIG. 2.
Figure 4:
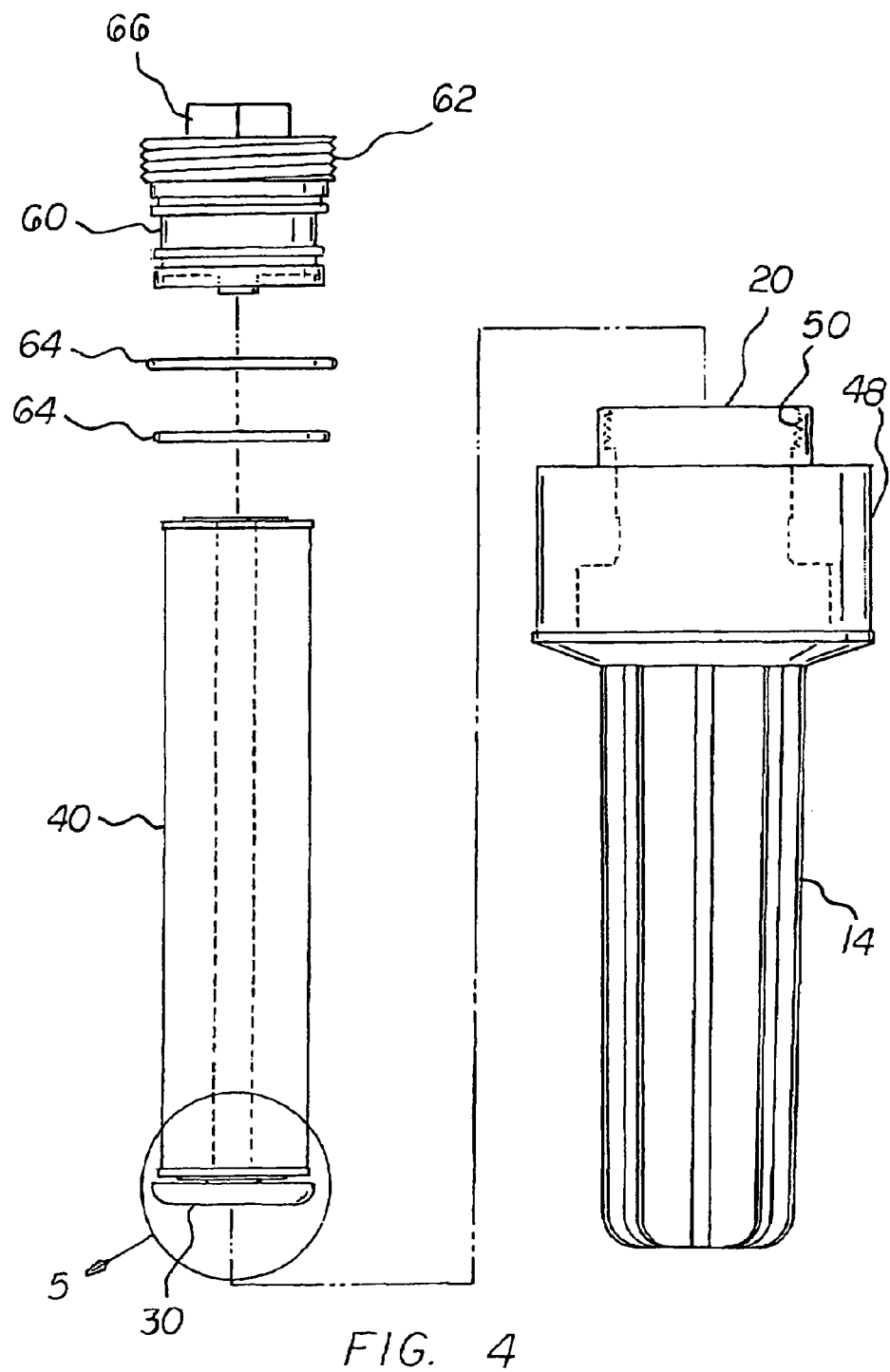
FIG. 4 is an exploded front elevational view of the system shown in FIG. 1.

With reference now to the drawings, and in particular to FIG. 1 thereof, the preferred embodiment of the new and improved top loading filter canister system embodying the principles and concepts of the present invention and generally designated by the reference numeral 10 will be described.

The present invention, the top loading filter canister system 10 is comprised of a plurality of components. Such components in their broadest context include a housing, a basket, a filter, a stationary cap and a filter cap. Such components are individually configured and correlated with respect to each other so as to attain the desired objective.

First provided is a housing 14. The housing has a vertically extending cylindrical side wall 16. The side wall has a lower end 18 below. The side wall has an open upper end 20 above. A length is provided between the upper and lower ends. The housing has a cylindrical chamber 22. The chamber has an enlarged upper region 24. The upper region of the chamber has a length. The length of the upper region is equal to between 10 and 25 percent of the length of the housing. The lower end of the housing has a lower passage 26. The lower passage has internal threads. In this manner a drain valve is accepted.

A basket 30 is provided. The basket is positioned within the chamber. The basket is supported at the lower end of the housing. The basket has radially interior, upwardly extending, resilient pins 32. The basket also has a radially exterior annular fluid passage 34. The basket also has an intermediate annular raised ridge 36. The purpose of the basket is to receive and retain particulate matter settling out from the liquid being filtered.

Provided next is a filter 40. The filter is formed has a central cylinder 42. The central cylinder is provided coaxial with the side wall. The central cylinder has outwardly extending filtering surfaces 44. The filter is removably received within the chamber. The filter is sealingly supported upon the raised ridge of the basket. The filter has an upper end and a lower end. The lower end of the filter removably receives the resilient pins of the basket.

Further provided is a stationary cap 48. The stationary cap is provided coaxial with the side wall attached to the upper end of the housing. The stationary cap has an upper end. The upper end of the stationary cap has a threaded aperture 50. The stationary cap has a radially extending input passage 52. The input passage extends from exterior of the system. A fluid channel 54 is provided. The fluid channel is provided between the input passage and the enlarged upper region of the chamber. The stationary cap has a radially extending exit passage 56. The exit passage extends to exterior of the system.

Provided last is a filter cap 60. The threaded exterior surface has a threaded exterior surface 62. The filter cap is removably received in the threaded aperture of the stationary cap. The threaded exterior surface has a diameter. The diameter of the threaded exterior surface is less than the diameter of the upper region of the housing. The diameter of the threaded exterior surface is greater than the diameter of the housing beneath the enlarged upper region. The filter cap has o-rings 64. The o-rings are provided beneath the threaded exterior surface. The o-rings are positionable against the stationary cap. The filter cap has a hexagonal raised section 66. In this manner the removal of the filter cap from the stationary cap is assisted. An L-shaped flow discharge passage 68 is provided. The lower end of the discharge passage has a flange 70. The flange is positioned within the filter. The discharge passage has an upper end. An annular flow cavity 72 is provided. The annual flow cavity is provided between the flow discharge passage and the exit passage. When removed the filter cap is adapted to provide access to the housing. In this manner the system may be serviced. Servicing of the system includes the changing of the filter.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A top loading filter canister system comprising:
   a housing having a cylindrical side wall with lower and upper ends and with a length there between, the housing having a cylindrical chamber with an enlarged upper region;
   a basket positioned within the chamber supported at the lower end of the housing;
   a filter formed with a central cylinder coaxial with the side wall and with outwardly extending filtering surfaces;
   a stationary cap attached to the upper end of the housing, the stationary cap having an upper end with a threaded aperture, the stationary cap having input and exit passages; and
   a filter cap having a threaded exterior surface removably received in the threaded aperture of the stationary cap, a flow discharge passage with a lower end positioned within the filter and with an upper end coupled to the exit passage, an annular flow cavity between the flow discharge passage and the exit passage.

2. The system as set forth in claim 1 wherein the enlarged upper region has a length equal to between 10 and 25 percent of the length of the housing.

3. The system as set forth in claim 1 wherein the basket has radially interior, upwardly extending, resilient pins removably positioned in the filter and wherein the basket also has a radially exterior annular fluid passage, and wherein the basket also has an intermediate annular raised ridge for supporting the filter.

4. A top loading filter canister system (10) for filtering fluids and featuring ready servicing of the system, the system comprising, in combination:
   a housing (14) having a vertically extending cylindrical side wall (16) with a lower end (18) below and an open upper end (20) above and with a length there between, the housing having a cylindrical chamber (22) with an enlarged upper region (24) and with a length equal to between 10 and 25 percent of the length of the housing, the lower end of the housing having a lower passage (26) with internal threads to accept a drain valve;
   a basket (30) positioned within the chamber supported at the lower end of the housing, the basket having radially interior, upwardly extending, resilient pins (32), the basket also having a radially exterior annular fluid passage (34), the basket also having an intermediate annular raised ridge (36);
   a filter (40) formed with a central cylinder (42) coaxial with the side wall and with outwardly extending filtering surfaces (44), the filter being removably received within the chamber and sealingly supported upon the raised ridge of the basket, the filter having an upper end and a lower end, the lower end of the filter removably receiving the resilient pins of the basket;
   a stationary cap (48) coaxial with the side wall attached to the upper end of the housing, the stationary cap having an upper end with a threaded aperture (50), the stationary cap having a radially extending input passage (52) extending from exterior of the system, a fluid channel (54) between the input passage and the enlarged upper region of the chamber, the stationary cap having a radially extending exit passage (56) extending to exterior of the system; and
   a filter cap (60) having a threaded exterior surface (62) removably received in the threaded aperture of the stationary cap, the threaded exterior surface having a diameter less than the diameter of the upper region of the housing and a diameter greater than the diameter of the housing beneath the enlarged upper region, the filter cap having o-rings (64) beneath the threaded exterior surface positionable against the stationary cap, the filter cap formed with a hexagonal raised section (66) to assist in the removal of the filter cap from the stationary cap, an L-shaped flow discharge passage (68) with a lower end formed as a flange (70) positioned within the filter and with an upper end, an annular flow cavity (72) between the flow discharge passage and the exit passage, the filter cap when removed adapted to provide access to the housing for service to the system including the changing of the filter.

* * * * *